Figure 1:
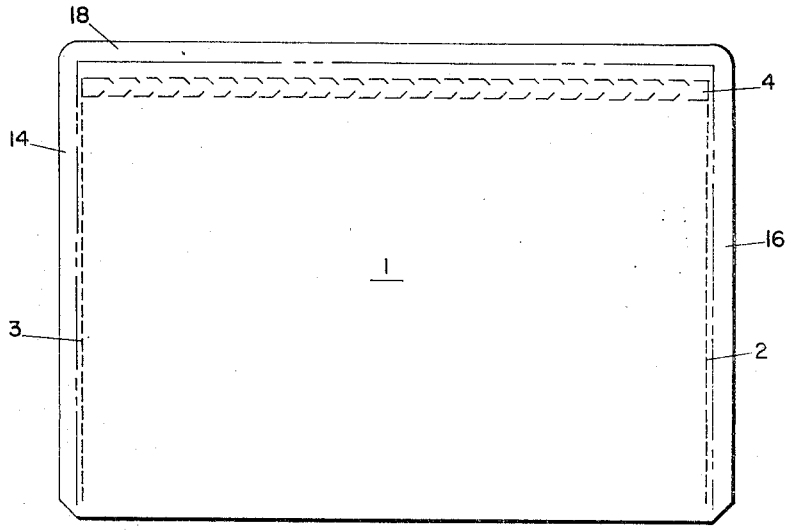
Figure 2:
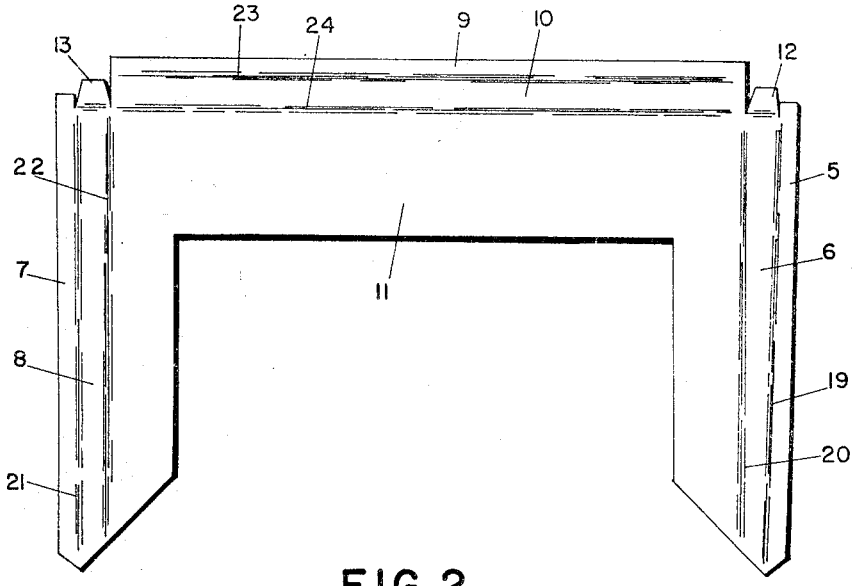
Figure 3:
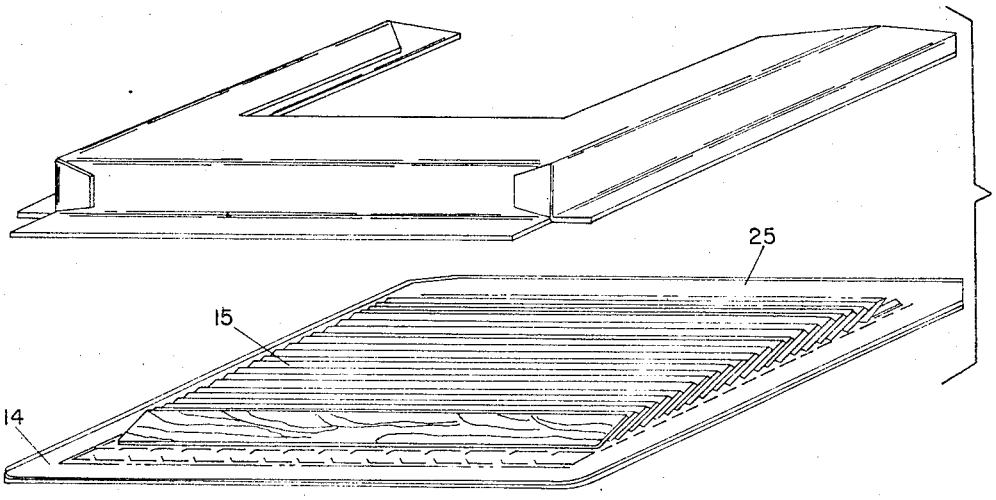
Figure 4:
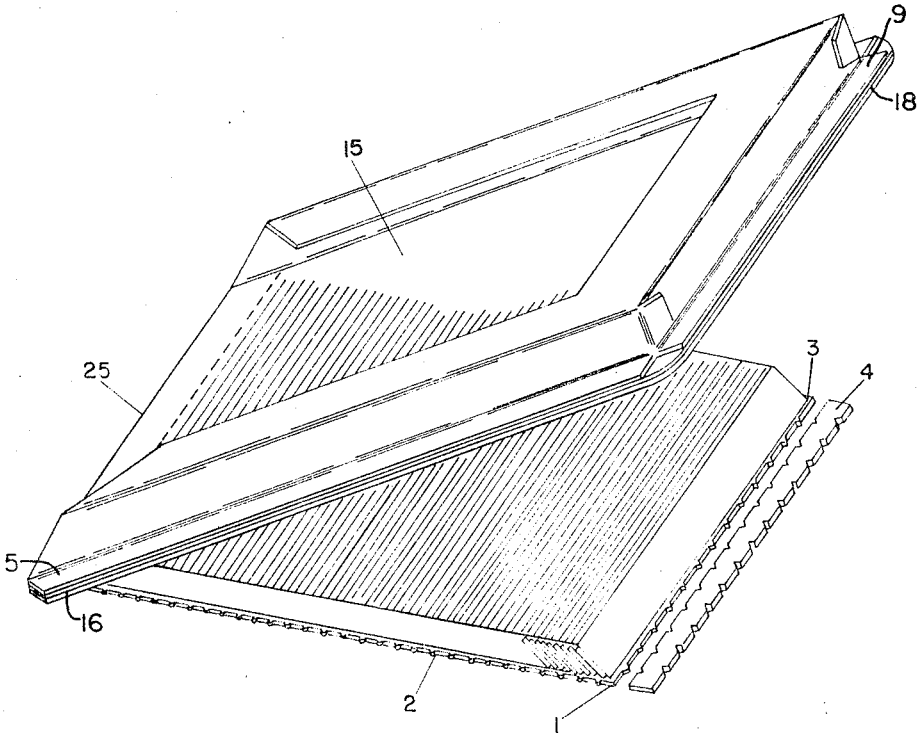

T 859,003

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED FEBRUARY 4, 1969

859 O.G. 41

635,175

PACKAGE AND PROCESS USING HOT MELT CURTAIN COATING ON SUBSTRATE ATTACHED TO PREFORMED LID

Rex Eells and Ted L. Douglas, both of P.O. Box 511, Kingsport, Tenn. 37662

Filed May 1, 1967. Published Feb. 4, 1969
Class 99—174
2 Sheets Drawing. 8 Pages Specification

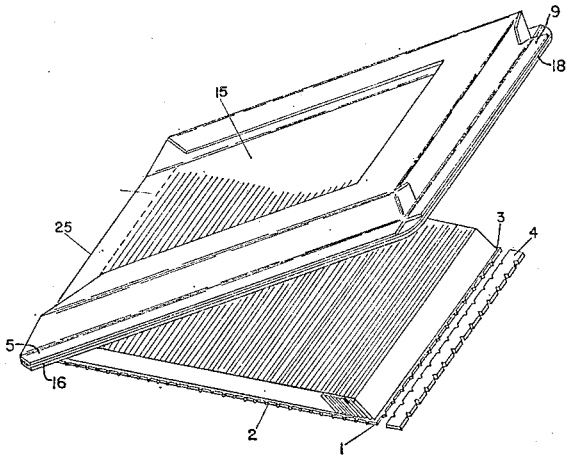

An improved method for packaging and a package for an article such as bacon wherein the article is placed on a substrate and curtain coated with a molten thermoplastic coating material. A separate, preformed lid is sealed to the substrate along edge portions or lips thereof extending outwardly from the article. Tear strips or perforations along three of the substrate lip portions allow ready access to the contents of the package when the substrate is broken along these lines. The lid remains secure to the lip portions and is hinged to the substrate by the thermoplastic coating secured to the remaining edge or lip portion of the substrate. The lid advantageously has an opening so the article can be seen through the transparent coating material.

T 859,003

DEF. PUB. #635175

SHEET 1 OF 2

Rex Eells
Ted L. Douglas
INVENTORS

BY William T. Franck
Charles L. Good
ATTORNEYS

T 859,003

DEF. PUB. #635175

SHEET 2 OF 2

Rex Eells
Ted L. Douglas
INVENTORS

BY William J. French
Charles L. Good
ATTORNEYS